May 10, 1949.

G. C. ZACHAE 2,469,910

ELECTRICAL TESTING DEVICE FOR
ATTACHMENT TO FLASHLIGHTS
Filed Feb. 13, 1946

INVENTOR
Gottfried Carl Zachae
BY Owen W. Kennedy
ATTORNEY

Patented May 10, 1949

2,469,910

UNITED STATES PATENT OFFICE 2,469,910

ELECTRICAL TESTING DEVICE FOR ATTACHMENT TO FLASHLIGHTS

Gottfried Carl Zachae, Norwich, Conn.

Application February 13, 1946, Serial No. 647,288

3 Claims. (Cl. 175—183)

The present invention relates to an electrical testing device particularly adapted for use by electricians in testing wiring connections, lamp bulbs, fuses, and other electrical devices that are subject to failure.

In my Patent No. 2,292,730, issued August 11, 1942, there is shown and described an electrical testing device of the above indicated character, which device is in the form of a convenient attachment which may be mounted on and forms part of a conventional portable flashlight, whereby the battery of the flashlight may be utilized for testing electrical circuits or other devices under examination. The particular flashlight attachment disclosed by my aforementioned patent is adapted for use in connection with any conventional flashlight by the removal of the regular end cap, and the substitution therefor of a special cap providing connections whereby current from the battery may be passed through circuits or devices under test.

According to the present invention, there is provided an improved electrical testing device for attachment to a conventional flashlight, which incorporates not only certain features of my previously patented device, but also includes the provision of means for quickly determining the approximate electrical resistances of the circuits or devices under test. Briefly stated, the improved device of the present invention consists of an electrical meter conveniently mounted on the cap that is attached to the portable flashlight, with the meter being so connected to the testing terminals of the attachment as to permit the resistances of the circuits or devices under test to be approximately determined as the testing device is used. In this way, the electrician utilizing the device can conveniently make tests heretofore impossible to make without the use of expensive meters and complicated testing equipment that is not readily portable.

The above and other advantageous features of the invention will hereinafter more fully appear from the following description considered in connection with the accompanying drawings, in which.

Figure 1:
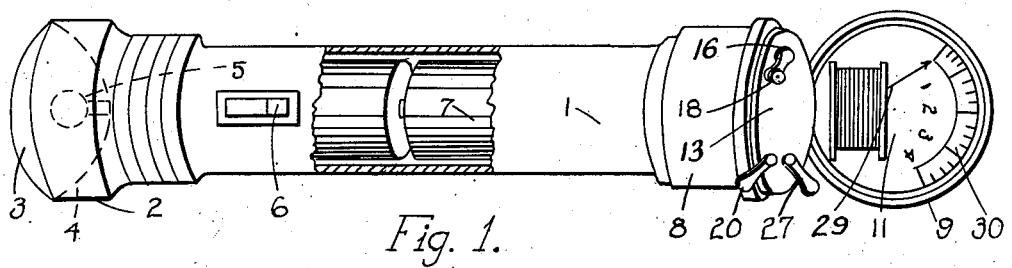
Fig. 1 is a view in perspective of a conventional flashlight on which is mounted an electrical testing device embodying the invention, with the meter mounting being open for use.
Figure 2:
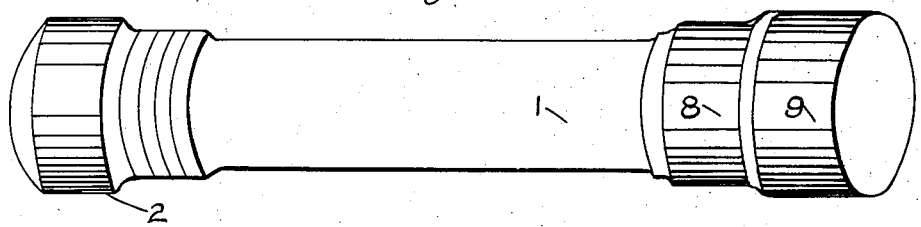
Fig. 2 is a perspective view similar to Fig. 1, with the meter mounting closed.

Referring first to Figs. 1 and 2, there is shown for purposes of illustration a conventional flashlight, comprising the usual tubular shell 1, on one end of which is mounted a cap 2 containing the lens 3, with the associated reflector 4 and bulb 5 being shown in dotted lines. A switch 6 is provided on the side of the shell 1, by means of which the bulb 5 may be illuminated from the usual battery 7 within the shell. The particular construction of the flashlight is conventional, and is of importance only to the extent that my improved testing device mounted on a special cap 8 may be readily attached to the shell 1 in place of the usual cap that is employed to make an electrical connection between one end of the battery 7 and the metallic shell 1.

The testing cap 8 is constructed in accordance with my aforesaid Patent No. 2,292,730, in that it provides a connection to the battery 7 and several testing terminals, later described. In accordance with the present invention, the cap 8 also provides a cover 9 of cup-like form, connected to the cap 8 by a hinge 10 and containing a small electrical meter 11. When the device is being used for testing, the cover 9 is turned back on its hinge 10, as shown in Fig. 1, so that the meter 11 may be readily observed. However, when the device is not in use, the cover 9 can be closed as shown in Fig. 2, so as to entirely conceal and protect the meter 11 until it is desired to again use the device for testing purposes.

Figure 3:
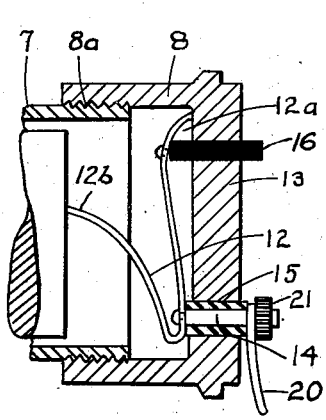
Fig. 3 is a sectional view of the device shown in Fig. 1 removed from the flashlight, and on an enlarged scale.

As best shown in Fig. 3, the special testing cap 8 is adapted to be secured to the shell 1 by any suitable means, such as threads 8a, cooperating with the threaded end of the shell 1, as in the usual flashlight construction. The entire cap 8 is composed of electrical conducting material, and one end of the battery 7 within the shell 1 is normally connected to the cap 8 by a contact spring 12 mounted on the cap 8, so that closure of the switch 6 with the cap 8 in place will cause illumination of the bulb 5, through its connection to the other end of the battery 7.

The contact spring 12 is of resilient material reversely bent, so that the yielding end portions 12a and 12b of the spring engage one end of the battery 7 and a circular disk portion 13 forming part of the cap 8. The spring 12 is mounted on the cap 8 by means of a stud 14 passing through the disk portion 13 and insulated therefrom at 15.

Therefore, the stud 14 is always connected to one side of the battery 7, and can be used for testing purposes in a manner later described.

The end portion 12a of the spring 12 which normally bears on the cap 8 carries a disconnecting button 16 of insulating material, which extends freely through an opening in the disk portion 13 and projects beyond the surface thereof. By exerting a pressure on the outer end of said button 16, the end portion 12a of the spring can be flexed away from the cap 8, to thereby disconnect the entire shell 1 from the inside terminal of the battery 7. Therefore, depression of the button 16 with the switch 6 closed will result in extinguishing the flashlight bulb 5, although one side of the battery will still be connected to the testing stud 14.

Figure 5:
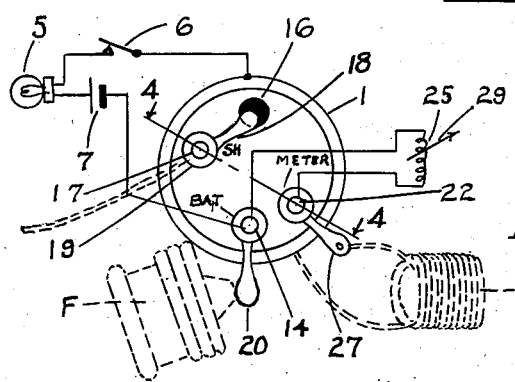
Fig. 5 is a diagram illustrating the use of the meter for testing an electrical circuit, with the testing cap being shown in plan.

In order to maintain the button 16 in a depressed condition, the disk portion 13 of the cap 8 provides a stud 17 carrying a latch arm 18, held on the stud 17 by a nut 19. The arm 18 can be swung to engage the button 16 as shown in Fig. 5, and by turning down on the nut 19, the latch arm 18 will hold the button 16 depressed sufficiently to disengage the end portion 12a of the spring 12 from the cap 8. Assuming that the switch 6 is closed, holding in of the button 16 by the latch arm 18 will prevent illumination of the bulb 5, and the flashlight can then be used for a test by connecting the ends of the circuit or device to be tested between the stud 14 and either the cap 8 or the shell 1.

For convenience in making such a test, the stud 14 carries a terminal 20 held thereon by a nut 21. Should it be desired to test a plug type fuse, indicated in dotted lines at F in Fig. 5, it is only necessary to apply the terminal 20 to the inside terminal of the fuse while holding the outside sleeve of the fuse in engagement with the cap 8. If the fuse is good, the bulb 5 will light, since the fuse itself will provide a current path from one side of the battery 7, inner portion 12b of spring 12, stud 14 and from thence through the fuse F to the cap 8 and the shell 1 through the closed switch 6, bulb 5 back to the other side of the battery.

Figure 4:
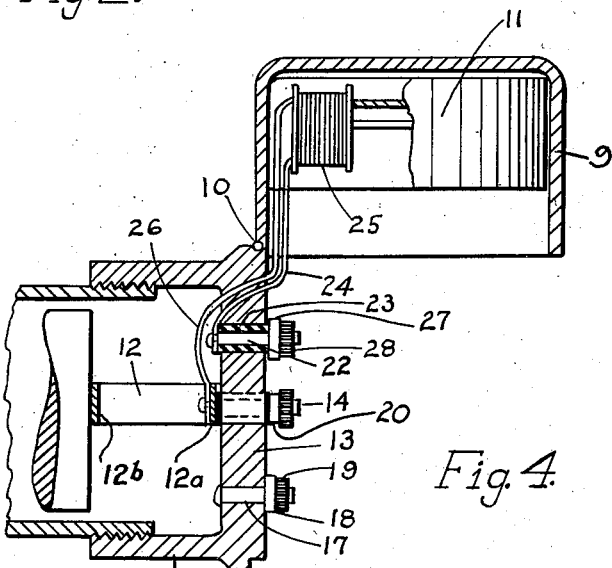
Fig. 4 is a sectional view along the line 4—4 of Fig. 5, looking in the direction of the arrows.

As previously pointed out, the device of the present invention also provides means for measuring the approximate resistance of an electrical circuit or other device. To this end, the disk 13 of the cap 8 provides a third stud 22 that is insulated from the cap at 23, with its inner end connected by a lead 24 to one terminal of the winding 25 of the meter 11. As best shown in Fig. 4, the other lead 26 of the winding 25 is connected to the testing stud 14 which carries the battery contact spring 12, so that one side of the meter winding 24 is always connected to one side of the battery 7, so long as the cap 8 remains on the shell 1. For convenience in utilizing the meter 9 and for testing purposes, the stud 22 carries a terminal 27 held thereon by means of a nut 28.

Should it be desired to check the operativeness of a piece of electrical equipment provided with a coil, indicated in dotted lines at C in Fig. 5, one lead from the coil C is connected to the terminal 27, while the other lead is connected to the cap 8 or shell 1. If the coil C under test is able to pass current, the resulting energization of the meter winding 9 in series with the coil C will result in a deflection of the pointer 29 of the meter. As shown in Fig. 5, the scale 30 of the meter is graduated ohms and volts, so that the deflection of the pointer 29 will give quite an accurate indication as to whether the resistance of the coil under test is high or low.

From the foregoing, it is apparent that by the present invention there is provided an improved electrical testing device in the form of a convenient attachment which may be readily mounted on a conventional portable flashlight after removal of its end cap. As previously pointed out, my device may be conveniently employed for testing electrical circuits or various other electrical devices under examination, such as fuses, lamp bulbs, windings, and condensers. For convenience of the user, the disk portion 13 of the cap 8 bears suitable markings adjacent the testing studs 14 and 22, as shown in Fig. 5.

For example, the stud 14 may be marked "Bat." to indicate that this stud is permanently connected to one terminal of the battery 7 through the contact spring 12. The stud 22 may be marked "Meter" to indicate that this stud is permanently connected to one terminal of the winding 25 of the meter 11.

While electrical devices may be tested as previously described by establishing circuits through such devices from either the battery terminal 20 or the meter terminal 27 and the cap 8 or shell 1, the third stud 17 carrying the latch arm 18 may be used for making connection to the shell. For this reason, the stud 17 is marked "Shell" and, if desired, a testing lead may be connected to the stud 17 by its nut 19, as indicated in dotted lines in Fig. 5.

In actual use of my improved device by an electrician, a great many circuits and devices can be quickly tested as to the ability of the circuit or device to transmit current, as well as its relative resistance. For example, a fuse which appears to be unblown can be quickly tested through either terminal 20 or 27. If the fuse is unblown, the flashlight bulb 5 will be illuminated when the fuse is applied as shown in Fig. 5. If, however, the same fuse when applied to meter terminal 27 and the shell 1 gives a very small deflection of the meter pointer, that would indicate a faulty connection in the fuse itself, by reason of the high indicated resistance; otherwise the resistance would be very small. When testing a device such as a relay with a coil of relatively high resistance, connection of the coil between meter terminal 27 and the shell will show a small deflection of the pointed, even though testing of the same coil from the battery terminal 20 would not light the bulb 5, due to the same high resistance.

I claim:

1. A testing device for attachment to a flashlight having an open-ended casing of conducting material containing a battery, comprising, a cup-shaped cap providing a portion of conducting material adapted to be detachably secured over and to be electrically connected to the open end of the flashlight casing, a resilient conducting member insulatingly carried within said cap and having one end portion thereof extending outwardly from said cap so as to be adapted for engaging one pole of the battery, the other end of said member being normally disposed in contact with said cap, a manually operable push button mounted within said cap and operable from the outside of said cap to break the normal connection between said cap and said resilient member, first and second testing terminals each mounted upon the outer face of and insulated from said cap, said first terminal being electrically connected to said resilient member, a meter secured upon said cap, an electrical lead connecting one side of said meter to said resilient member, and an electrical lead connecting the other side of said meter to said second terminal.

2. A testing device for attachment to a flashlight having an open-ended casing of conducting material containing a battery, comprising, a cup-shaped cap providing a portion of conducting material adapted to be detachably secured over and to be electrically connected to the open end of the flashlight casing, a resilient conducting member insulatingly carried within said cap and having one end portion thereof extending outwardly from said cap so as to be adapted for engaging one pole of the battery, a manually operable switch mounted upon the outer face of said cap for making and breaking an electrical circuit between said resilient member and said cap, first and second testing terminals each mounted upon the outer face of and insulated from said cap, said first terminal being electrically connected to said resilient member, a cup-shaped cover hingedly mounted upon said cap so as to be removably positioned over said terminals, a meter mounted within said cover, an electrical lead connecting one side of said meter to said resilient member and an electrical lead connecting the other side of said meter to said second terminal.

3. A testing device for attachment to a flashlight having an open-ended casing of conducting material containing a battery, comprising, a cup-shaped cap providing a portion of conducting material adapted to be detachably secured over and to be electrically connected to the open end of the flashlight casing, a resilient conducting member insulatingly carried within said cap and having one end portion thereof extending outwardly from said cap so as to be adapted for engaging one pole of the battery, the other end of said member being normally disposed in contact with said cap, a manually operable push button mounted within said cap and operable from the outside of said cap to break the normal connection between said cap and said resilient member, first and second testing terminals each mounted upon the outer face of and insulated from said cap, said first terminal being electrically connected to said resilient member, a third testing terminal mounted upon and electrically connected with the outer face of said cap, a cup-shaped cover hingedly mounted upon said cap so as to be removably positioned over said terminal, a meter mounted within said cover, an electrical lead connecting one side of said meter to said resilient member, and an electrical lead connecting the other side of said meter to said second terminal.

GOTTFRIED CARL ZACHAE.

REFERENCES CITED

The following references are of record in the file of this patent:

UNITED STATES PATENTS

| Number | Name | Date |
|---|---|---|
| 1,528,709 | Trimble | Mar. 3, 1925 |
| 1,707,051 | Colosoff | Mar. 26, 1929 |
| 2,292,730 | Zachae | Aug. 11, 1942 |

OTHER REFERENCES

Electrical World, August 8, 1925, pages 257–259.